US008401396B2

(12) United States Patent
Sunaga et al.

(10) Patent No.: US 8,401,396 B2
(45) Date of Patent: Mar. 19, 2013

(54) OPTICAL COMMUNICATION MODULE AND METHOD FOR USING THE SAME

(75) Inventors: Yoshinori Sunaga, Hitachinaka (JP); Kenichi Tamura, Hitachi (JP); Yoshiaki Ishigami, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 982 days.

(21) Appl. No.: 12/230,950

(22) Filed: Sep. 8, 2008

(65) Prior Publication Data

US 2009/0202252 A1 Aug. 13, 2009

(30) Foreign Application Priority Data

Feb. 13, 2008 (JP) .................................. 2008-031598

(51) Int. Cl.
*H04B 10/12* (2006.01)
*G02B 6/42* (2006.01)
(52) U.S. Cl. ........... 398/141; 398/139; 398/142; 385/39
(58) Field of Classification Search .................... 385/88, 385/92, 93, 38–51, 14–29, 30–35; 398/139, 398/141, 142; 250/227.25; 264/1.26
See application file for complete search history.

(56) References Cited

U.S. PATENT DOCUMENTS

| 6,034,821 | A | 3/2000 | Schenfeld et al. | |
| 6,334,716 | B1 * | 1/2002 | Ojima et al. | 385/89 |
| 6,722,793 | B2 * | 4/2004 | Althaus et al. | 385/92 |
| 2002/0176667 | A1 * | 11/2002 | Melchior et al. | 385/47 |
| 2003/0063844 | A1 | 4/2003 | Caracci et al. | |
| 2004/0240805 | A1 * | 12/2004 | Vakhshoori et al. | 385/98 |

FOREIGN PATENT DOCUMENTS

| JP | 11-149953 | A | 6/1999 |
| JP | 2005-315992 | | 11/2005 |
| JP | 2005315992 | A * | 11/2005 |
| WO | WO 03/029857 | A1 | 4/2003 |

OTHER PUBLICATIONS

Notification of Reason(s) for Refusal dated Aug. 2, 2011, with English translation.

* cited by examiner

*Primary Examiner* — Jessica Stultz
*Assistant Examiner* — Joshua King
(74) *Attorney, Agent, or Firm* — McGinn IP Law Group, PLLC

(57) ABSTRACT

An optical communication module includes an optical package including at least one semiconductor optical device, an optical filter for reflecting light of a specific wavelength and transmitting light of an other wavelength, an optical block including a transparent material and the optical filter, a housing that houses the optical package and the optical block, an in-housing circuit board housed in the housing and mounting a peripheral electrical circuit for the optical package thereon, and an electrical connector electrically connected to the in-housing circuit board and exposed at a bottom surface of the housing. The optical block further includes a front lens portion at a front side face of the housing, a rear lens portion at a rear side face of the housing, a light inputting port, and a light outputting port. The optical filter is arranged to obliquely intersect with an optical axis passing through the front lens portion and the rear lens portion at a predetermined angle. The optical package is arranged such that an optical axis between the optical filter and the optical package is substantially orthogonal to an optical axis between the front lens portion and the optical filter.

15 Claims, 7 Drawing Sheets

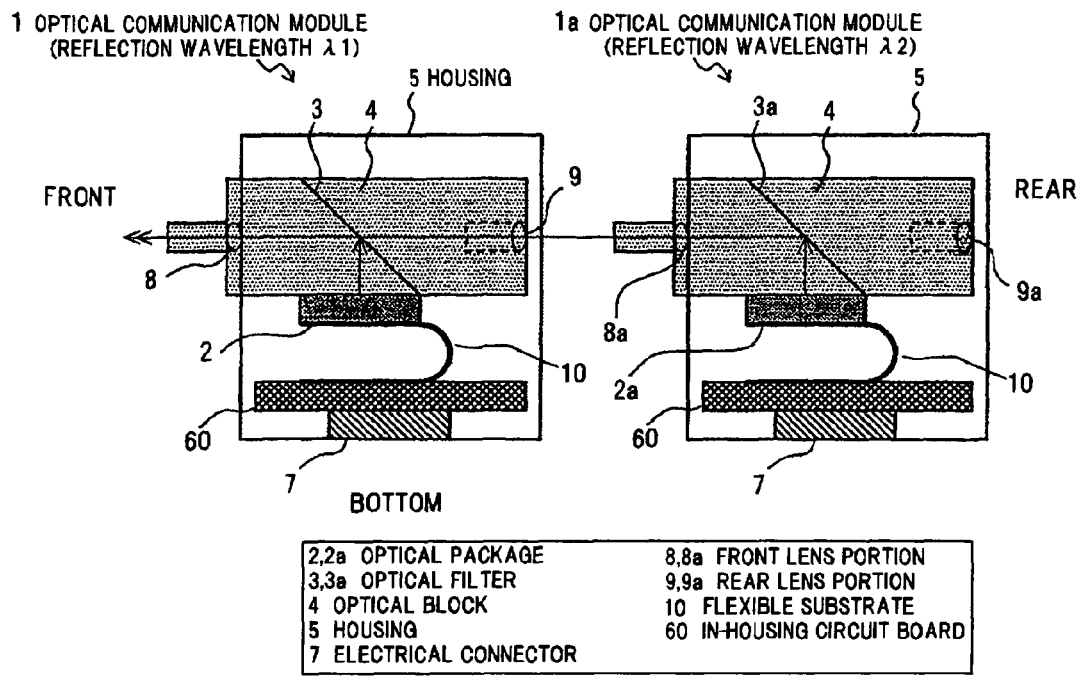
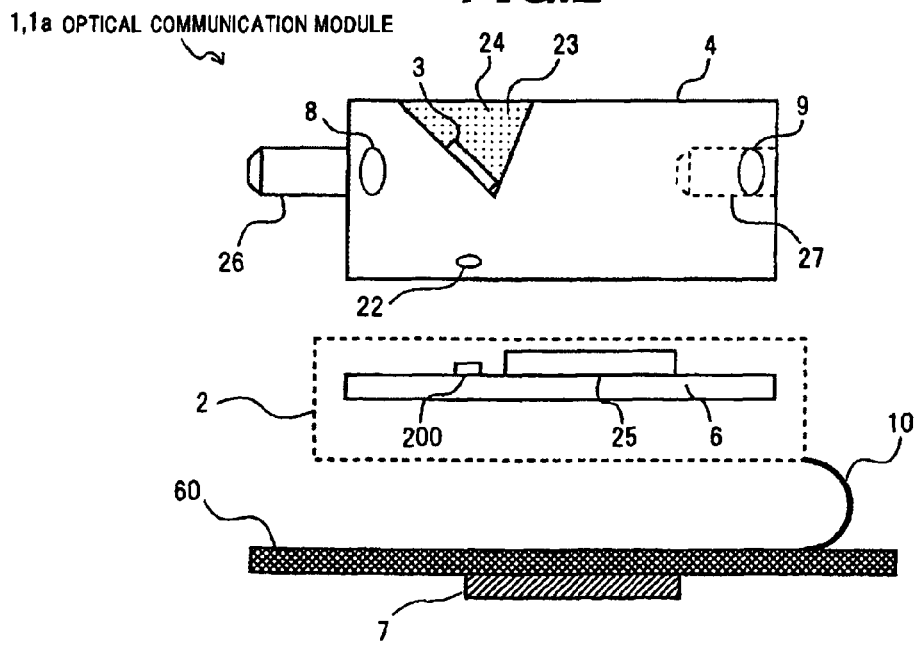

| 2 OPTICAL PACKAGE | 26 PIN PORTION |
| 3 OPTICAL FILTER | 27 HOLE PORTION |
| 4 OPTICAL BLOCK | 28 SPACER PORTION |
| 5 HOUSING | 50 PERIPHERAL CIRCUIT |
| 7 ELECTRICAL CONNECTOR | 60 IN-HOUSING CIRCUIT BOARD |

71 OPTICAL COMMUNICATION MODULE
77 REAR PROTRUDING PORTION

| 2 OPTICAL PACKAGE | 73 HOUSING |
| 3 OPTICAL FILTER | 74 MPO CONNECTOR |
| 7 ELECTRICAL CONNECTOR | 75 FRONT RECEPTACLE PORTION |
| 60 IN-HOUSING CIRCUIT BOARD | 76 EXTERNAL OPTICAL FIBER |
| 72 OPTICAL BLOCK | |

71a OPTICAL COMMUNICATION MODULE
71 OPTICAL COMMUNICATION MODULE
74 MPO CONNECTOR
76 EXTERNAL OPTICAL FIBER
81 OPTICAL COMMUNICATION BOARD

FIG.9

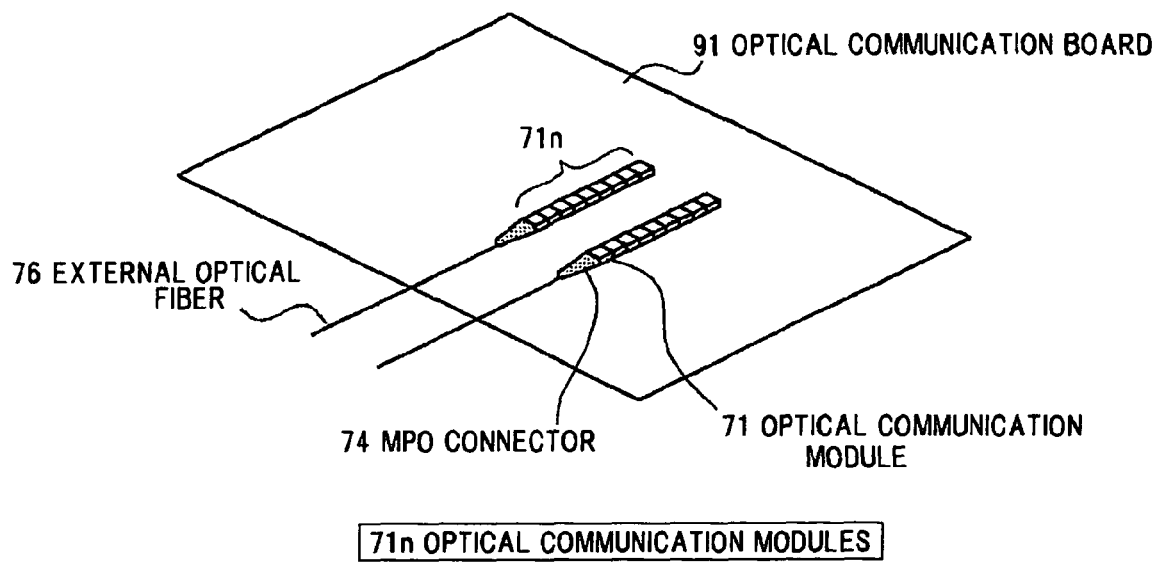

- 91 OPTICAL COMMUNICATION BOARD
- 71n
- 76 EXTERNAL OPTICAL FIBER
- 74 MPO CONNECTOR
- 71 OPTICAL COMMUNICATION MODULE

| 71n OPTICAL COMMUNICATION MODULES |

FIG.10

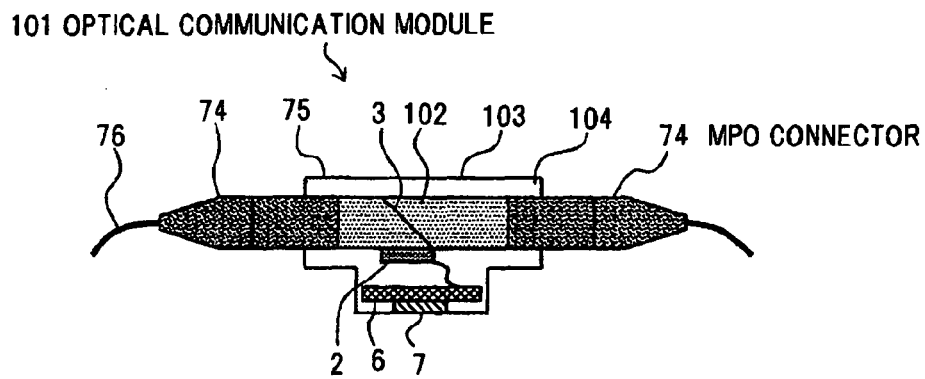

101 OPTICAL COMMUNICATION MODULE

74 MPO CONNECTOR

| 2   | OPTICAL PACKAGE |
| 3   | OPTICAL FILTER |
| 6   | INTRA- OPTICAL PACKAGE CIRCUIT BOARD |
| 7   | ELECTRICAL CONNECTOR |
| 75  | FRONT RECEPTACLE PORTION |
| 76  | EXTERNAL OPTICAL FIBER |
| 102 | OPTICAL BLOCK |
| 103 | HOUSING |
| 104 | REAR RECEPTACLE PORTION |

- 111 OPTICAL COMMUNICATION BOARD
- 112 RELAY OPTICAL FIBER
- 101 OPTICAL COMMUNICATION MODULE
- 76 EXTERNAL OPTICAL FIBER

- 123 OPTICAL COMMUNICATION BOARD
- 121 OPTICAL COMMUNICATION MODULE
- 122 OPTICAL FIBER

| 131,131a,131b | OPTICAL COMMUNICATION MODULE |
| 132 | EXTERNAL OPTICAL FIBER |
| 133,133a,133b,133c | MPO CONNECTOR |
| 134,134a,134b | OPTICAL FIBER |
| 135 | RUBBER BOOT |

| 141,141a,141b | OPTICAL COMMUNICATION MODULE |
| 142,142a | OPTICAL FIBER |
| 143,143a,143c,143d | MPO CONNECTOR |

US 8,401,396 B2

OPTICAL COMMUNICATION MODULE AND METHOD FOR USING THE SAME

The present application is based on Japanese Patent Application No. 2008-031598 filed on Feb. 13, 2008, the entire contents of which are incorporated herein by reference.

BACKGROUND OF THE INVENTION

1. Field of the Invention

The present invention relates to an optical communication module and a method for using the same intended to eliminate a tangle in optical fiber interconnection and to reduce the amount of an optical fiber used for interconnection.

2. Related Art

An optical communication module (which is also called an optical transceiver) incorporating an optical package for optical communication and its peripheral circuit in a housing includes: an optical transmitter module in which a light-emitting element as a semiconductor optical device is incorporated in the optical package and the peripheral circuit in the optical package is a light-producing driver circuit; an optical receiver module in which a light receiving element as a semiconductor optical device is incorporated therein and the peripheral circuit in the optical package is a first-stage amplifier circuit; and an optical transmitter and receiver module in which elements and circuits both for light-emitting and light receiving are incorporated. Since the optical communication modules are not so different in optical structure from each other, the optical transmitter module will be described as an example below.

An optical communication module is used being mounted on an optical communication board disposed in a housing of a fixed communication device. Therefore, the optical communication module is provided with an electrical connector exposed at the bottom surface of the housing.

An example of related art to the invention is disclosed in Japanese patent No. 3134850 (equivalent to JP-A-11-149004).

The optical communication board has plural electrical connectors in order to mount plural optical communication modules thereon. In increasing an optical communication channel, one optical communication module only has to be inserted into one electrical connector. However, at least one optical fiber 122 is necessary for one optical communication module 121. Thus, as shown in FIG. 12, one optical fiber 122 must be added when adding one optical communication module 121 such that plural optical fibers 122 are arranged on an optical communication board 123. Although the plural optical fibers 122 are shown in orderly arrangement in FIG. 12, it is impossible to arrange them orderly, and, in fact, the optical fibers 122 will be tangled. Needless to say, the optical fibers 122 will be also tangled outside the communication device.

Furthermore, the optical fiber 122 is interconnected between the communication device for housing the optical communication board 123 and an optical communication board of a nearby communication device, where the interconnection distance is generally several meters to several tens of meters. Since the amount of the optical fiber needed can be calculated by (the number of fibers)×(interconnection distance), the amount of the optical fiber used increases every time the optical communication channel is added.

THE SUMMARY OF THE INVENTION

It is an object of the invention to provide an optical communication module and a method for using the same that can eliminate a tangle in optical fiber interconnection and reduce the amount of an optical fiber used.

(1) According to one embodiment of the invention, an optical communication module comprises:

an optical package including at least one semiconductor optical device;

an optical filter for reflecting light of a specific wavelength and transmitting light of an other wavelength;

an optical block comprising a transparent material and the optical filter;

a housing that houses the optical package and the optical block;

an in-housing circuit board housed in the housing and mounting a peripheral electrical circuit for the optical package thereon; and an electrical connector electrically connected to the in-housing circuit board and exposed at a bottom surface of the housing, wherein the optical block further comprises a front lens portion at a front side face of the housing, a rear lens portion at a rear side face of the housing, a light inputting port, and a light outputting port, the optical filter is arranged to obliquely intersect with an optical axis passing through the front lens portion and the rear lens portion at a predetermined angle, and the optical package is arranged such that an optical axis between the optical filter and the optical package is substantially orthogonal to an optical axis between the front lens portion and the optical filter.

In the above embodiment (1), the following modifications and changes can be made.

(i) The optical block is afloat held in the housing.

(ii) The in-housing circuit board is disposed at a bottom part of the housing, and the electrical connector is mounted on the in-housing circuit board and exposed at the bottom surface of the housing.

(iii) The in-housing circuit board is disposed at a top part of the housing and connected to the electrical connector via a flexible board.

(iv) The optical block further comprises a pin portion protruding out of the housing near the front lens portion and a hole portion to be fitted onto the pin portion near the rear lens portion, the housing comprises a front receptacle portion around the front les portion, the front receptacle portion being shaped such that it can hold an MPO connector when receiving the MPO connector therein, and the optical block further comprises a rear protruding portion protruding behind the housing, the rear protruding portion being shaped to be compatible with the MPO connector.

(v) The housing comprises a rear receptacle portion around the rear les portion, and the front receptacle portion is shaped such that it can hold an MPO connector when receiving the MPO connector therein.

(2) According to another embodiment of the invention, a method for using the optical communication module according to the embodiment (1) comprises:

providing the N optical communication modules wherein N is 2 or more; and arranging the N optical communication modules such that the front lens portion of the i+1-th optical communication module is disposed opposite the rear lens portion of the i-th optical communication module wherein i is 1 to N−1, wherein a reflection wavelength of the optical filter in each of the optical communication module is different from each other.

In the above embodiment (2), the following modifications and changes can be made.

(vi) The optical block further comprises a pin portion protruding out of the housing near the front lens portion and a hole portion to be fitted onto the pin portion near the rear lens portion, and the pin portion of the i+1-th optical communication module is fitted into the hole portion of the i-th optical communication module.

(vii) The housing comprises a front receptacle portion around the front les portion, the front receptacle portion being shaped such that it can hold an MPO connector when receiving the MPO connector therein, the optical block further comprises a rear protruding portion protruding behind the housing, the rear protruding portion being shaped to be compatible with the MPO connector, and the rear protruding portion of the i-th optical communication module is fitted into the front receptacle portion of the i+1-th optical communication module such that the front lens portion of the i+1-th optical communication module is disposed opposite the rear lens portion of the i-th optical communication module.

(viii) The housing comprises a front receptacle portion around the front les portion, the front receptacle portion being shaped such that it can hold an MPO connector when receiving the MPO connector therein, and a rear receptacle portion around the rear les portion, the front receptacle portion being shaped such that it can hold the MPO connector when receiving the MPO connector therein, wherein the method further comprising disposing a relay optical fiber with the MPO connectors at both ends thereof such that the MPO connectors of the relay optical fiber are fitted into the rear receptacle portion of the i-th optical communication module and the front receptacle portion of the i+1-th optical communication module, respectively, so that the rear lens portion of the i-th optical communication module can be optically connected to the front lens portion of the i+1-th optical communication module.

BRIEF DESCRIPTION OF THE DRAWINGS

Next, the present invention will be explained in more detail in conjunction with appended drawings, wherein:

FIG. 1 is a cross sectional view showing an optical communication module in a preferred embodiment according to the present invention;

FIG. 2 is a cross sectional view showing the optical communication module except its housing in FIG. 1;

FIG. 9 is a perspective view showing another usage state of the optical communication module in FIG. 7;

FIG. 10 is a cross sectional view showing an optical communication module in another preferred embodiment according to the present invention;

DESCRIPTION OF THE PREFERRED EMBODIMENTS

Figure 3:
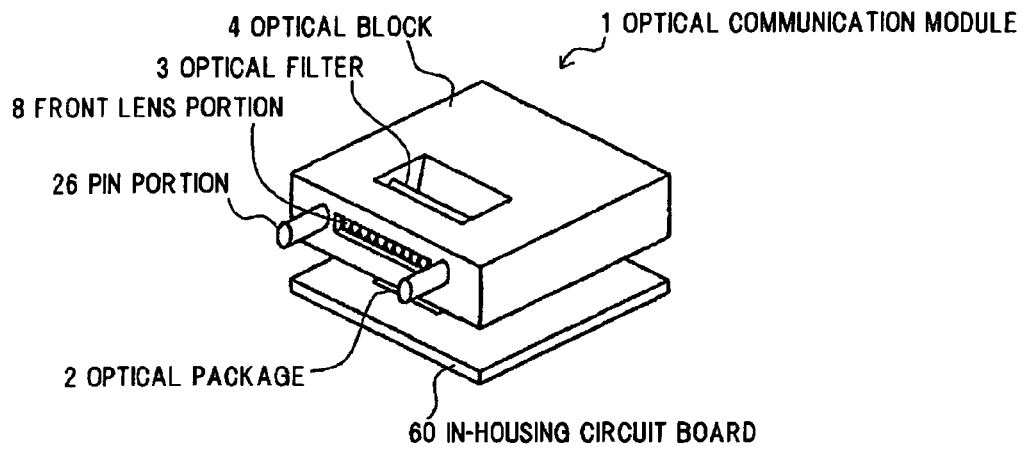
FIG. 3 is a perspective view showing the optical communication module except its housing in FIG. 1.

Preferred embodiments according to the present invention will be explained in more detail in conjunction with the appended drawings.

As shown in FIG. 1, an optical communication module 1 according to the present invention is composed of an optical package 2 incorporating at least one semiconductor optical device, an optical filter 3 reflecting light of a specific wavelength and transmitting light of other wavelengths, an optical block 4 formed of a transparent material and provided with the optical filter 3, a housing 5 for enclosing the optical package 2 and the optical block 4, an in-housing circuit board 60 housed in the housing 5 and mounting a peripheral electrical circuit of the optical package 2, and an electrical connector 7 electrically connected to the in-housing circuit board 60 exposed at the bottom surface of the housing 5.

The optical block 4 is formed such that one or more lenses to focus or collimate light are not separately prepared and installed at an appropriate position of the housing 5, but the lenses are integrally formed at an appropriate position of the optical block 4 formed of a transparent resin or glass. The optical block 4 also functions as a pedestal for embedding or installing other members therein.

The optical block 4 of the present invention is composed of a front lens portion 8 disposed outside the housing 5 from the front side face of the housing 5, and a rear lens portion 9 disposed outside the housing 5 from the rear side face of the housing 5. Although in this embodiment the front lens portion 8 is disposed outside the housing 5, it may be disposed inside the housing 5. In the same way, although the rear lens portion 9 is disposed inside the housing 5, it may be disposed outside the housing 5.

The optical block 4 is afloat held in the housing 5. Being afloat held means that the optical block 4 is not firmly fixed to the housing 5, but the optical block 4 is held in the housing 5 via other members (e.g., a flexible substrate 10 in this embodiment) being restricted loosely or without having any contact between the optical block 4 and the housing 5.

The weight of the optical block 4 of the present invention is about 1 g. On the other hand, elasticity by a bend of the flexible substrate 10 which afloat holds the optical block 4 is about 10 g, thus, it is possible to afloat hold the optical block 4 sufficiently. A shape and a material (e.g., an elastic modulus) of the flexible substrate 10 may be appropriately determined in accordance with the weight of the optical block 4. The flexible substrate 10 may be formed of polyimide, PET (polyethylene terephthalate), a liquid crystal polymer resin, an aramid resin or the like.

The optical filter 3 is arranged to obliquely intersect with an optical axis connecting the front lens portion 8 and the rear lens portion 9 at a predetermined angle. In this embodiment, the angle is 45°.

The optical package 2 has an oblique incident light axis at an angle opposite to the front lens portion 8 with respect to a front surface of the optical filter 3 and a reflected light axis thereof is coincident with the optical axis connecting the front lens portion 8 and the rear lens portion 9. Namely, the optical package 2 is disposed such that the light axis provided between the optical filter 3 and the optical package 2 defines an angle of 90° to the light axis provided between the front lens portion 8 and the optical filter 3.

A semiconductor optical device incorporated in the optical package 2 is a light-emitting element or a light receiving element. When the semiconductor optical device is a light-emitting element as in this embodiment, a peripheral circuit mounted on the in-optical package circuit board 6 is a light-producing driver circuit, a peripheral electrical circuit of the optical package 2 mounted on the in-housing circuit board 60 is a transmission circuit, and the optical communication module 1 is an optical transmitter module. On the other hand, when the semiconductor optical device is a light receiving element, a peripheral circuit mounted on the in-optical package circuit board 6 is a first-stage amplifier circuit, a peripheral electrical circuit of the optical package 2 mounted on the in-housing circuit board 60 is a receiver circuit, and the optical communication module 1 is an optical receiver module.

In case of using a light emitting element as the semiconductor optical device, the light-emitting element has broadband light-emitting properties and can emit light including at least a specific wavelength (a reflection wavelength of the optical filter 3) or has narrowband light-emitting properties and can emit only light of a specific wavelength. In case of using a light receiving element as the semiconductor optical device, the light receiving element has broadband light receiving properties and can receive light including at least the specific wavelength.

In this embodiment, the optical package 2 is fixed directly contacting the optical block 4. Meanwhile, the in-housing circuit board 60 is located on a bottom surface inside the housing 5 and is fixed to the housing 5 by means not shown in the drawings. The in-housing circuit board 60 is provided with the electrical connector 7 at the bottom surface of the housing 5. Consequently, the optical package 2 is separated from the in-housing circuit board 60, thus, the optical package 2 is connected to the in-housing circuit board 60 via the flexible substrate 10.

The flexible substrate 10 functions not only as a member for electrically connecting the optical package 2 to the in-housing circuit board 60, but also as an elastic member for afloat holding the optical block 4 in the housing 5.

The electrical connector 7 provides for an electrical connection by being engaged with an other electrical connector mounted on an optical communication board in a housing of a fixed communication device (not shown). For example, the electrical connector 7 is a 100-pin connector.

In this construction, as shown by an arrow in FIG. 1, light of a specific wavelength among light wavelengths emitted from the semiconductor optical device in the optical package 2 is outputted from the optical package 2, inputted to the front lens portion 8 by being reflected at the optical filter 3, and externally outputted through the front lens portion 8. On the other hand, light inputted to the rear lens portion 9 from outside is directly passed through the optical filter 3, inputted to the front lens portion 8, and outputted through the front lens portion 8.

Thus, in this case, the front lens portion 8 is a light outputting port and the rear lens portion 9 is a light inputting port.

Meanwhile, due to optical symmetric properties, when light of multi-wavelength is inputted to the front lens portion 8 from outside, light of a specific wavelength is inputted to the optical package 2 by being reflected at the optical filter 3 and light of other wavelengths is outputted through the rear lens portion 9 by being passed through the optical filter 3.

In other words, in this case, the front lens portion 8 is a light inputting port and the rear lens portion 9 is a light outputting port.

In either case, light of all wavelengths passes through between the front lens portion 8 and the optical filter 3, only light of a specific wavelength passes through between the optical filter 3 and the optical package 2, and only light of other wavelengths passes through between the optical filter 3 and the rear lens portion 9.

The optical communication module 1 of the present invention is remarkably effective when using plural optical communication modules, and therefore the case of using two optical communication modules as shown will be explained below. The optical filter 3 of the optical communication module 1 disposed forward has characteristics to reflect light with a wavelength of $\lambda 1$ and to transmit light with a wavelength other than $\lambda 1$. Meanwhile, the optical filter 3a of an optical communication module 1a disposed backward has characteristics to reflect light with a wavelength of $\lambda 2$ and to transmit light with a wavelength other than $\lambda 2$. Here, $\lambda 1$ is not equal to $\lambda 2$.

Light with a wavelength of $\lambda 2$ emitted from an optical package 2a of the optical communication module 1a is outputted through a front lens portion 8a and inputted to the rear lens portion 9 of the optical communication module 1. This light is directly passed through the optical filter 3 and externally outputted through the front lens portion 8. Meanwhile, light with a wavelength of $\lambda 1$ emitted from the optical package 2 of the optical communication module 1 is reflected at the optical filter 3 and externally outputted through the front lens portion 8 as already explained. In other words, light with a wavelength of $\lambda 1$ and light with a wavelength of $\lambda 2$ are multiplexed and outputted through the front lens portion 8.

If the outputted light is transmitted by being inputted into an optical fiber (not shown), only one optical fiber is required for two optical communication modules. Furthermore, it is possible to arrange serially similar optical communication modules behind the optical communication module 1a arranged behind the optical communication module 1, and, thus, it is possible to transmit wavelength-multiplexed light through only one optical fiber by changing a reflection wavelength of each optical filter.

Namely, in case of using the N optical communication modules 1, the N optical communication modules 1 are arranged in tandem such that the front lens portion 8 of the i+1-th optical communication module is opposite the rear lens portion 9 of the i-th optical communication module. Here, the reflection wavelength of the optical filter 3 of each optical communication module 1 is different from each other.

As a result, even when using plural optical communication modules or adding optical communication modules, it is possible to eliminate a tangle in optical fiber interconnection and to reduce the amount of the optical fiber used, which should be solved in the prior art.

In the embodiment of FIG. 1, the one semiconductor optical device in the optical package 2 of the optical communication module 1 is illustrated, but plural semiconductor optical devices may be used in the optical package 2. When aligning the plural semiconductor optical devices in one row or multiple rows, reflected light axes of the semiconductor optical devices on the optical filter 3 become light axes being parallel each other in one row or multiple rows. If the reflected light axes are each coincident with plural light axes being parallel each other which connect the front lens portion 8 and the rear lens portion 9, the optical effect as explained above about the one semiconductor optical device can be independently obtained for each the semiconductor optical devices.

Next, the embodiment of FIG. 1 will be explained in detail.

FIG. 2 and FIG. 3 show the inside of the housing of an optical communication module 1, where the housing and the electrical connector are omitted.

A semiconductor optical device 200 is mounted on an in-optical package circuit board 6 in the optical package 2.

The optical block 4 is composed of a semiconductor optical device-side lens portion 22 opposite the semiconductor optical device 200 in the optical package 2 in addition to a front lens portion 8 and a rear lens portion 9.

The optical block 4 has a hole 23 defined by two slopes formed by notching the top portion. One slope has an inclined angle (45° in this embodiment) so as to be a setting angle of the optical filter 3. The optical filter 3 is arranged to obliquely intersect with a light axis connecting the front lens portion 8 and the rear lens portion 9 at a predetermined angle (45° in this embodiment) by mounting the optical filter 3 on the slope of the hole 23. Then, the hole 23 is preferably filled with a filling material 24 having the substantially same refractive index as the optical block 4 so as to reduce loss in optical signals.

The plural semiconductor optical devices 200 are provided to form a VCSEL (Vertical Cavity Surface Emitting Laser) or PD (Photo Diode) array. A driver array or a TIA (Trans-Impedance Amplifier) array 25 is mounted as a peripheral electrical circuit of the semiconductor optical device 200 on the in-optical package circuit board 6. In response to this, the front lens portion 8 is formed a lens array in which plural lenses are parallel aligned in a row on the front surface. The rear lens portion 9 and the semiconductor optical device-side lens portion 22 are also formed a lens array in which plural lenses are parallel aligned in a row on each surface though it is not shown in the drawings.

The optical block 4 has a pin portion 26 protruding in a predetermined shape toward the outside of the housing 5 near the front lens portion 8, and a hole portion 27 to be engaged with the pin portion 26 near the rear lens portion 9. In this embodiment, the pin portion 26 is formed a cylindrical column and the hole portion 27 is formed a cylindrical hole, but they may be a polygonal column and a polygonal hole, respectively. In this embodiment, the pin portions 26 and the hole portions 27 are each provided by two in the longitudinal direction of the front lens portion 8 and the rear lens portion 9, respectively, and on both sides thereof, the number and the position thereof are not limited if only the light axis can be coincided.

Figure 4A:
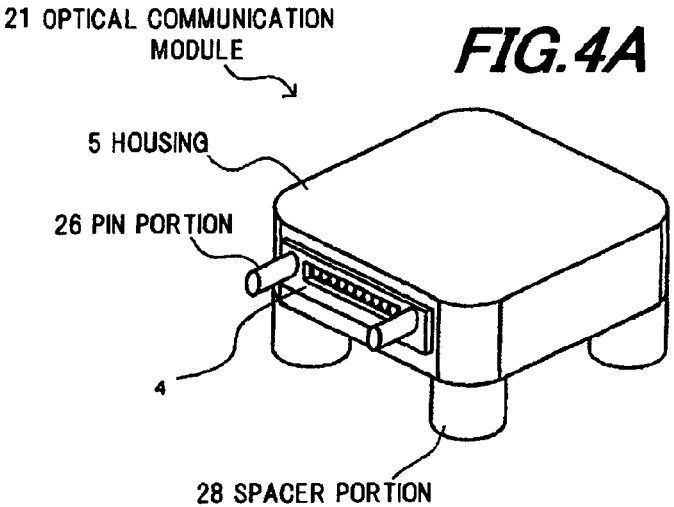
FIG. 4A is a perspective view showing an optical communication module in another preferred embodiment according to the present invention.

FIG. 4A shows the optical communication module 21 including the housing 5. As shown, the optical communication module 21 has the housing 5 for housing the optical block 4 except a part of the front side. The housing 5 is formed a substantially rectangular parallelepiped shape and has a spacer portion 28 protruding downward from the bottom surface at the four corners. An electrical connector (not shown) mounted on a lower surface of the in-housing circuit board 60 is exposed at the bottom surface of the housing 5. The height of the bottom surface of the housing 5 from the optical communication board is defined by the spacer portion 28 when engaging the electrical connector with the other electrical connector mounted on an optical communication board (not shown).

Figure 5:
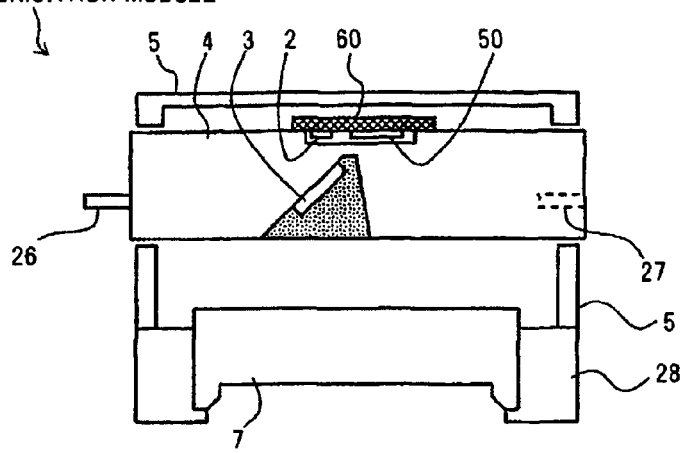
FIG. 5 is a cross sectional view showing an optical communication module in another preferred embodiment according to the present invention.

Similar to the optical communication module 1, an optical communication module 51 shown in FIG. 5 is composed of an optical package 2, an optical filter 3, an optical block 4, a housing 5, an in-housing circuit board 60, and an electrical connector 7. A peripheral circuit 50 of the optical package 2 is mounted on the in-housing circuit board 60.

Figure 4B:
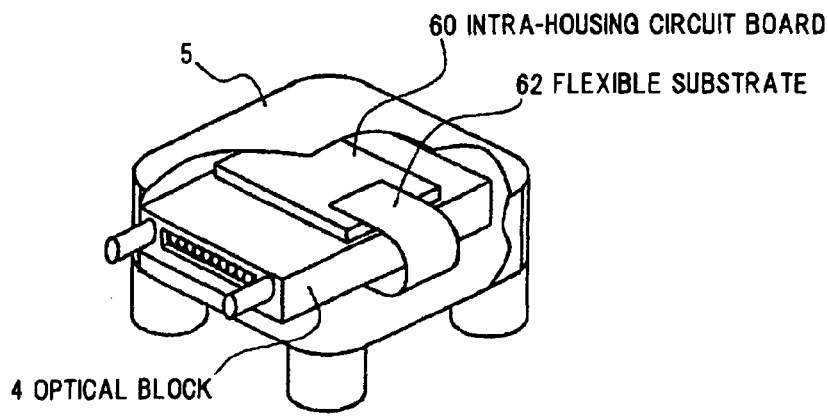
FIG. 4B is a perspective see-through view showing an inside of the optical communication module in FIG. 4A.

The in-housing circuit board 60 is fixed to the optical block 4. And the optical filter 3 is inversely inclined as compared to the optical filter 3 of the optical communication module 21 shown in FIG. 2. As shown in FIG. 4B, the in-housing circuit board 60 is connected to the electrical connector 7 in FIG. 5 via a flexible substrate 62 wired around the outside of the side surface of the optical block 4.

Figure 6:
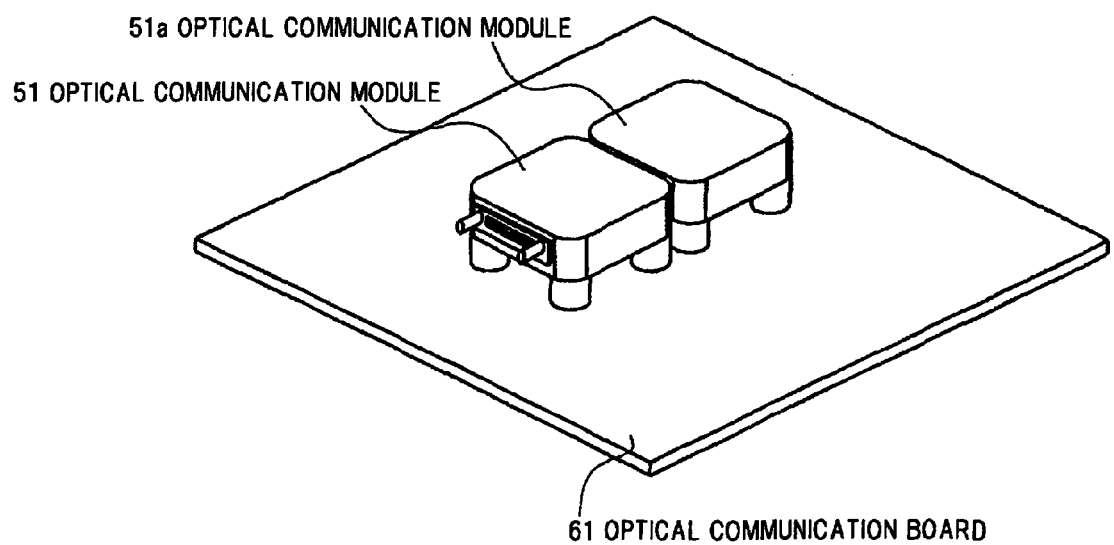
FIG. 6 is a perspective view showing a usage state of the optical communication module in FIG. 5.

FIG. 6 shows a method of using the two optical communication modules 51 in FIG. 5 connected in series.

As shown in FIG. 6, the optical blocks 4 of the optical communication modules 51 and 51a are positioned and connected to each other by engaging the pin portion 26 on the front side surface of the optical communication module 51a with the hole portion 27 on the back side surface of the optical communication module 51. By the positioning, the light axis of the rear lens portion 9 of the optical communication module 51 is coincided with the light axis of the front lens portion 8 of the optical communication module 51a.

In this case, since the optical block 4 is afloat held in the housing 5 of the optical communication modules 51 and 51a, it is possible to position them such that the optical blocks 4 are aligned in a straight line by the engagement of the pin portion 26 with the hole portion 27 even when there is a misalignment between the housings 5.

The optical communication modules 51 and 51a are mounted on a optical communication board 61 while allowing the electrical connector 7 to be engaged with the other electrical connector mounted on the optical communication board 61.

In case of using the N optical communication modules 51, the N optical communication modules 51 are connected in tandem such that the rear lens portion 9 of the i-th optical communication module is opposite the front lens portion 8 of the i+1-th optical communication module, where the reflection wavelength of the optical filter 3 of each optical communication module 1 is different from each other.

Figure 7:
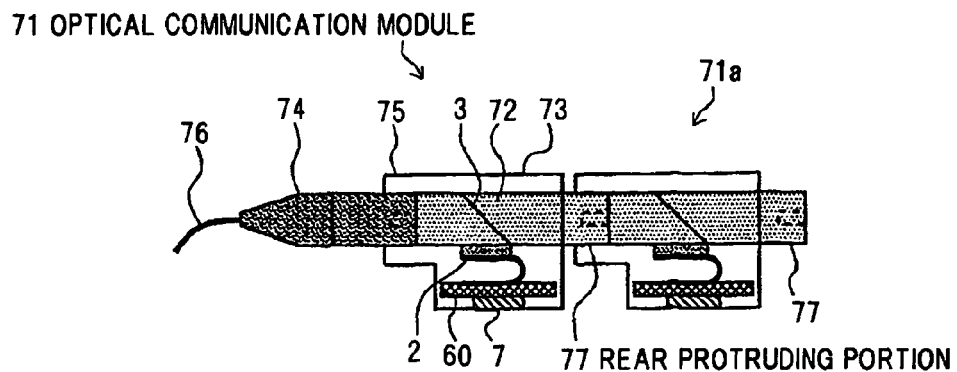
FIG. 7 is a cross sectional view showing an optical communication module in another preferred embodiment according to the present invention.

Similar to optical communication module 1, an optical communication module 71 in FIG. 7 is composed of an optical package 2, an optical filter 3, an optical block 72, a housing 73, an in-housing circuit board 60, and an electrical connector 7.

The housing 73 has a front receptacle portion 75 around the front lens portion 8 (see FIG. 1), where the front receptacle portion 75 is shaped such that it can hold an MPO (Multi-fiber Push On) connector 74 when engaged with the MPO connector 74 fitted thereinto. Since the shape enabled to hold the MPO connector 74 is as defined by the standards, the explanation is omitted herein. The MPO connector 74 is attached to one end of an external optical fiber 76 wired from a communication device or the like (not shown). When the MPO connector 74 is engaged with the front receptacle portion 75, the MPO connector 74 is mechanically held and the light axis of the front lens portion 8 is coincident with that of the external optical fiber 76.

The optical block 72 has a rear protruding portion 77 protruding by a predetermined distance or more toward the back side of the housing 73, and the rear protruding portion 77 is shaped to be engaged with the front receptacle portion 75 (of another housing 73 behind) and to be compatible with the MPO connector 74 (i.e., shaped as defined by the standards).

Figure 8:
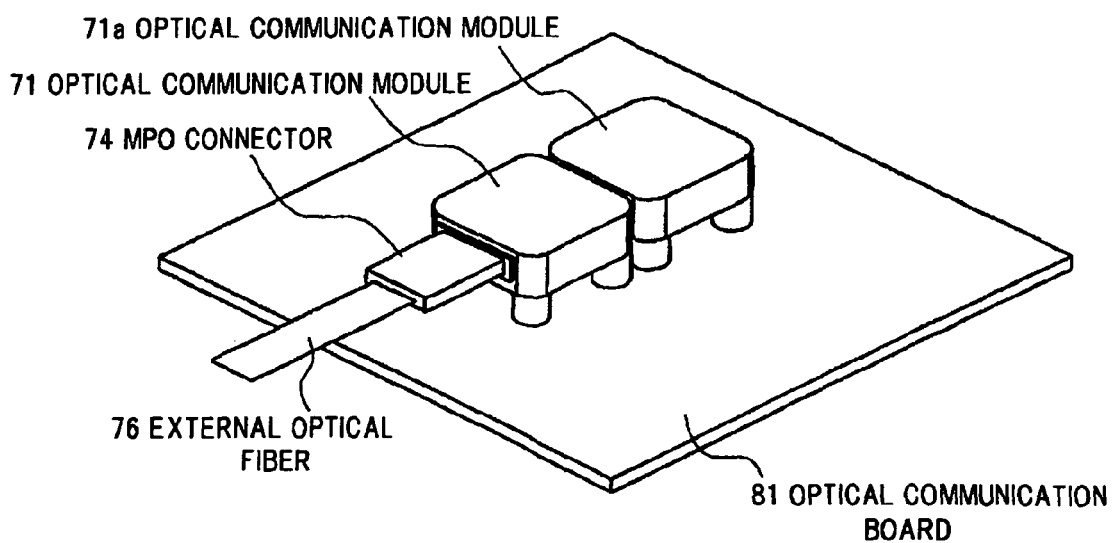
FIG. 8 is a perspective view showing a usage state of the optical communication module in FIG. 7.

As shown in FIG. 8, in case of using the two optical communication modules 71 and 71a connected in series, since the optical block 72 is afloat held in the housing 73 of the optical communication module 71, it is possible to position them such that the optical blocks 72 are aligned in a straight line by the engagement of the rear protruding portion 77 protruding from the back side of the optical communication module 71 with the front receptacle portion 75 of the optical communication module 71a even when there is a misalignment between the housings 73.

The optical communication modules 71 and 71a are mounted on an optical communication board 81 while allowing the electrical connector 7 to be engaged with the other electrical connector mounted on the optical communication board 81. The MPO connector 74 with the external optical fiber 76 is engaged with the front receptacle portion 75 of the optical communication module 71. The external optical fiber 76 is, for example, a multi-core tape fiber.

Since the optical structure inside the two optical communication modules 71 and 71a as shown in FIG. 8 is the same as FIG. 1, transmission of light of each wavelength will be explained below in conjunction with FIG. 1 and FIG. 8.

Light with a wavelength of $\lambda 2$ emitted from the optical package 2a of the optical communication module 71a is outputted through the front lens portion 8a, inputted to the rear lens portion 9 of the optical communication module 71, then inputted to the external optical fiber 76 through the front lens portion 8 while being directly passed through the optical filter 3. On the other hand, light with a wavelength of $\lambda 1$ emitted from the optical package 2 of the optical communication module 71 is inputted to the external optical fiber 76 through the front lens portion 8 by being reflected at the optical filter 3. Thus, the external optical fiber 76 is to multiplex and transmit light with a wavelength of $\lambda 1$ and light with a wavelength of $\lambda 2$.

In this way, the only one external optical fiber 76 is required for the two optical communication modules 71 and 71a. Furthermore, it is possible to arrange serially similar optical communication modules behind the optical communication module 71a arranged behind the optical communication module 71, and, thus, it is possible to transmit the wavelength-multiplexed light through the only one external optical fiber 76 by changing a reflection wavelength of each optical filter.

In case of using the N optical communication modules 71 having the front receptacle portion 75 and the rear protruding portion 77 as shown in FIG. 7, the rear protruding portion 77 of the i-th optical communication module 71 is fitted into the front receptacle portion 75 of the i+1-th optical communication module 71. As a result, the front lens portion 8 of the i+1-th optical communication module 71 is opposite the rear lens portion 9 of the i-th optical communication module 71. Here, the reflection wavelength of the optical filter 3 of each optical communication module 71 is different from each other.

Figure 13:
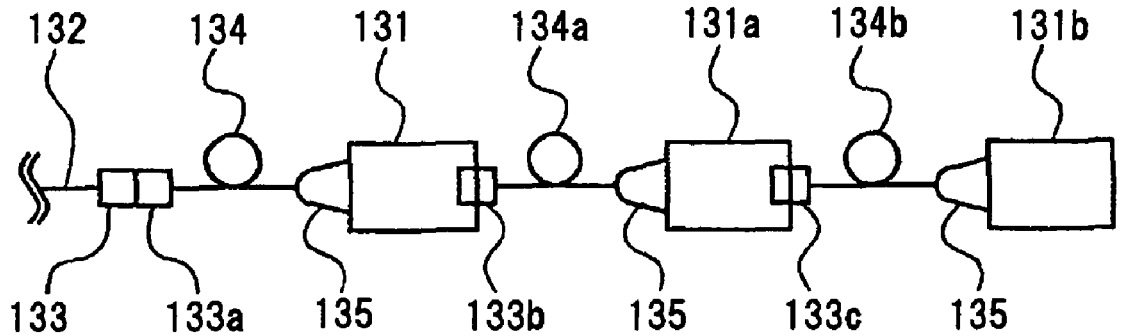
FIG. 13 is a plane view showing a usage state of an optical communication module in another preferred embodiment according to the present invention.
Figure 14:
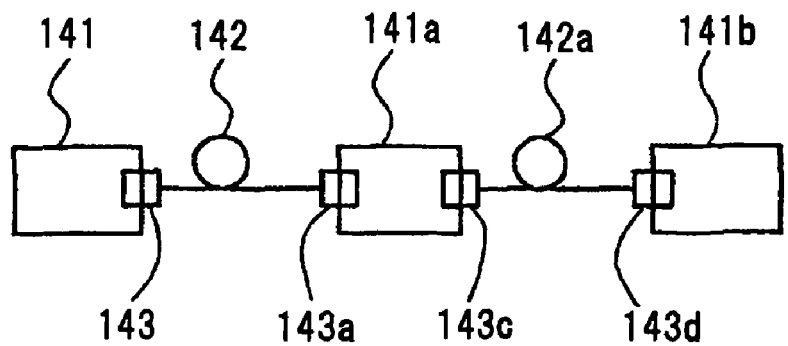
FIG. 14 is a plane view showing a usage state of an optical communication module in another preferred embodiment according to the present invention.

FIG. 13 and FIG. 14 show modifications of this embodiment.

In the optical communication module 71 shown in FIG. 7 and FIG. 8, the MPO connector 74 for the external optical fiber 76 can be attached to or detached from the front receptacle portion 75 of the optical communication module 71.

As shown in FIG. 13, the modification is composed such that one end of optical fibers 134, 134a and 134b is fixed to the inside of optical communication modules 131, 131a and 131b. Furthermore, MPO connectors 133a, 133b and 133c are attached to the other end of the optical fibers 134, 134a and 134b.

In detail, the MPO connector 133a of the optical fiber 134 is connected to an MPO connector 133 of an external optical fiber 132, one end of the optical fiber 134 is protected by a rubber boot 135 and fixed to the inside of the optical communication module 131, such that it is optically connected to the front lens portion 8. The optical communication modules 131a and 131b are arranged at appropriate intervals behind the optical communication module 131. The MPO connector 133b of the optical fiber 134a is connected to the back side of the optical communication module 131 and one end of the optical fiber 134a is protected by the rubber boot 135 and connected to the front side of the optical communication module 131a. Furthermore, an MPO connector 133c of the optical fiber 134b is connected to the back side of the optical communication module 131a and one end of the optical fiber 134b is protected by the rubber boot 135 and connected to the front side of the optical communication module 131b.

As shown in FIG. 14, optical communication modules 141a and 141b are arranged at appropriate intervals behind an optical communication module 141. An MPO connector 143 of an optical fiber 142 is connected to the back side of the optical communication module 141 and an MPO connector 143a at the other end of the optical fiber 142 is connected to the front side of the optical communication module 141a. Furthermore, an MPO connector 143c of an optical fiber 142a is connected to the back side of the optical communication module 141a and an MPO connector 143d at the other end of the optical fiber 142a is connected to the front side of the optical communication module 141b.

In this way, the plural optical communication modules may be optically connected in series using the optical fibers with the MPO connectors at both ends.

As shown in FIG. 13 and FIG. 14, the optical communication modules 131 and 141 can be serially connected via the optical fiber. Therefore, it is possible to freely arrange the optical communication modules on the optical communication board 81 (see FIG. 8).

As shown in FIG. 9, the MPO connector 74 for the external optical fiber 76 is attached to the top optical communication module 71 of the N optical communication modules 71n mounted in tandem on an optical communication board 91.

Alternatively, in case of using more optical communication modules 71, the optical communication modules 71 in another row may be mounted on the optical communication board 91 and the external optical fiber 76 may be connected to the top of the optical communication modules 71. In this case, one row of the optical communication modules 71 may be a group of optical transmitter modules and the other row may be a group of optical receiver modules. Of course, both rows of the optical communication modules 71 may be optical transmitter and receiver modules.

Similar to the optical communication module 1 shown in FIG. 1, an optical communication module 101 shown in FIG. 10 is composed of an optical package 2, an optical filter 3, an optical block 102, a housing 103, an in-housing circuit board 6, and an electrical connector 7.

Similar to the housing 73 of the optical communication module 71 explained with respect to FIG. 7, the housing 103 has a front receptacle portion 75 around the front lens portion 8 (see FIG. 1), where the front receptacle portion 75 is shaped such that it can hold the MPO connector 74 when engaged with the MPO connector 74 fitted thereinto. Furthermore, the housing 103 has a rear receptacle portion 104 around the rear lens portion 9 (see FIG. 1), where the rear receptacle portion 104 is shaped such that it can hold the MPO connector 74 when engaged with the MPO connector 74 fitted thereinto.

Different from the above embodiments, the MPO connector 74 is also connected to the back side of the optical communication module 101. Therefore, the optical communication module 101 operates such that light inputted from the side of the rear MPO connector 74 and light of a specific wavelength among light wavelengths emitted from the semiconductor optical device 2 in the optical communication module 101 are outputted to the side of the front MPO connector 74.

Figure 11:
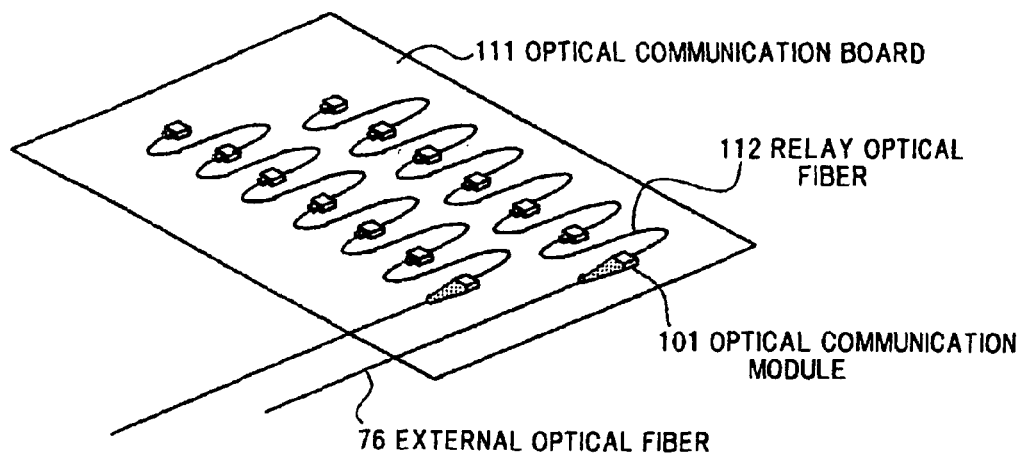
FIG. 11 is a perspective view showing a usage state of the optical communication module in FIG. 10.
Figure 12:
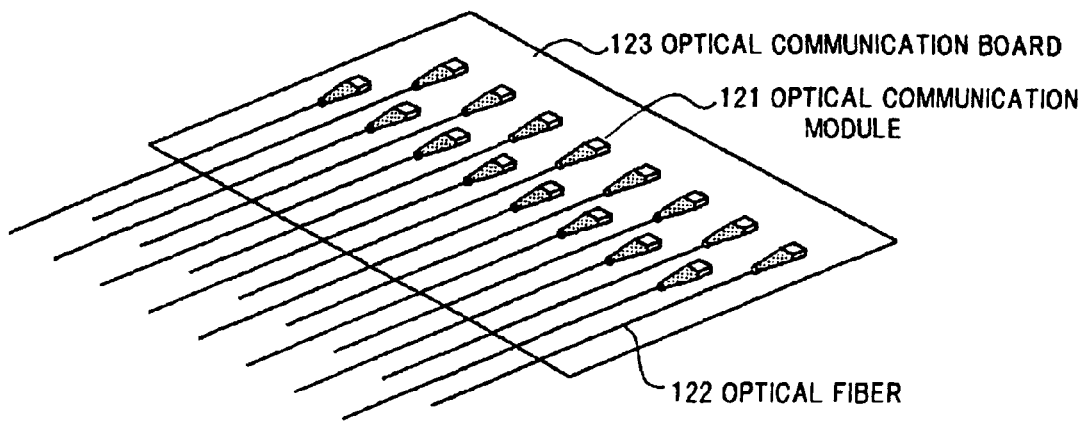
FIG. 12 is a perspective view showing a usage state of the conventional optical communication module.

As shown in FIG. 11, in case of using the N optical communication modules 101 having the front receptacle portion 75 and the rear receptacle portion 104, the optical communication modules 101 are mounted on an optical communication board 111 in an appropriate arrangement and at appropriate intervals. In this embodiment, the N optical communication modules 101 are arranged in one row aligning so as to be the same front-back direction with a predetermined interval in a direction orthogonal to the front-back direction.

The MPO connectors 74 attached to both ends of a relay optical fiber 112 are engaged with the rear receptacle portion 104 of the i-th optical communication module 101 and the front receptacle portion 75 of the i+1-th optical communication module 101, respectively. As shown in FIG. 11, the relay optical fiber 112 is wired being bent into an S between the two communication modules 101.

As a result, the rear lens portion 9 of the i-th optical communication module and the front lens portion 8 of the i+1-th optical communication module are optically connected via the relay optical fiber 112. Here, the reflection wavelength of the optical filter 3 of each optical communication module 101 is difference from each other.

The MPO connector 74 with the external optical fiber 76 is attached to the front receptacle portion 75 of the first optical communication module 101. As a result, light of different wavelengths outputted from the optical communication modules 101 is multiplexed and transmitted to the external optical fiber 76.

Furthermore, in case of using more optical communication modules 101, the optical communication modules 101 may be mounted on another space of the optical communication board 111 and the external optical fiber 76 may be connected to the top of the optical communication modules 101.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An optical communication module, comprising:
   an optical package including at least one semiconductor optical device;
   an optical filter for reflecting light of a specific wavelength and transmitting light of an other wavelength;
   an optical block comprising a transparent material and the optical filter;
   a housing that houses the optical package and the optical block;
   an in-housing circuit board housed in the housing and mounting a peripheral electrical circuit for the optical package thereon; and
   an electrical connector electrically connected to the in-housing circuit board and exposed at a bottom surface of the housing,
   wherein the optical block further comprises a front lens portion at a front side face of the housing, a rear lens portion at a rear side face of the housing, a light inputting port, a light outputting port, a pin portion protruding in a predetermined shape toward outside of the housing near the front lens portion, and a hole portion adapted to be engaged with a pin portion of an other optical communication module near the rear lens portion;
   wherein the optical filter is arranged to obliquely intersect with an optical axis passing through the front lens portion and the rear lens portion at a predetermined angle,
   wherein the optical package is arranged such that an optical axis between the optical filter and the optical package is substantially orthogonal to an optical axis between the front lens portion and the optical filter, and
   wherein the optical package and the optical block are held afloat in the housing.

2. The optical communication module according to claim 1, wherein the in-housing circuit board is disposed at a bottom part of the housing, and
   wherein the electrical connector is mounted on the in-housing circuit board and is exposed at the bottom surface of the housing.

3. The optical communication module according to claim 1, wherein the in-housing circuit board is disposed at a top part of the housing and connected to the electrical connector via a flexible board.

4. The optical communication module according to claim 1, wherein the optical block further comprises a pin portion protruding out of the housing near the front lens portion and a hole portion to be fitted onto the pin portion near the rear lens portion,
   wherein the housing comprises a front receptacle portion around the front les portion, the front receptacle portion being shaped such that it can hold an MPO (Multi-fiber Push On) connector when receiving the MPO connector therein, and
   wherein the optical block further comprises a rear protruding portion protruding behind the housing, the rear protruding portion being shaped to be compatible with the MPO connector.

5. The optical communication module according to claim 1, wherein the housing comprises a rear receptacle portion around the rear lens portion, and the front receptacle portion is shaped such that it can hold an MPO (Multi-fiber Push On) connector when receiving the MPO connector therein.

6. A method for using the optical communication module according to claim 1, said method comprising:
   providing N optical communication modules wherein N is 2 or more; and
   arranging the N optical communication modules such that the front lens portion of an i+1-th optical communication module is disposed opposite the rear lens portion of an i-th optical communication module wherein i is 1 to N−1,
   wherein a reflection wavelength of the optical filter in each of the optical communication modules is different from each other.

7. The method according to claim 6, wherein the optical block further comprises the pin portion protruding out of the housing near the front lens portion and the hole portion to be fitted onto the pin portion of the other optical communication module near the rear lens portion, and
   wherein the pin portion of the i+1-th optical communication module is fitted into the hole portion of the i-th optical communication module.

8. The method according to claim 6, wherein the housing comprises a front receptacle portion around the front les portion, the front receptacle portion being shaped to hold an MPO (Multi-fiber Push On) connector when receiving the MPO connector therein,
   wherein the optical block further comprises a rear protruding portion protruding behind the housing, the rear protruding portion being shaped to be compatible with the MPO connector, and wherein the rear protruding portion of the i-th optical communication module is fitted into the front receptacle portion of the i+1-th optical communication module such that the front lens portion of the i+1-th optical communication module is disposed opposite the rear lens portion of the i-th optical communication module.

9. The method according to claim 6, wherein the housing comprises a front receptacle portion around the front les portion, the front receptacle portion being shaped to hold an MPO (Multi-fiber Push On) connector when receiving the MPO connector therein, and a rear receptacle portion around the rear lens portion, the rear receptacle portion being shaped to hold the MPO connector when receiving the MPO connector therein, and wherein the method further comprises disposing a relay optical fiber with the MPO connectors at both ends thereof such that the MPO connectors of the relay optical fiber are fitted into the rear receptacle portion of the i-th optical communication module and the front receptacle portion of the i+1-th optical communication module, respectively, so that the rear lens portion of the i-th optical communication module optically connects to the front lens portion of the i+1-th optical communication module.

10. The optical communication module according to claim 1, wherein a light axis of the rear lens portion coincides with a light axis of the front lens portion.

11. The optical communication module according to claim 1, wherein the pin portion is configured to engage with a hole portion of yet an other optical communication module such that the optical block of the optical communication module aligns with an optical block of said yet the other optical communication module when there is a misalignment between the housing of the optical communication module and a housing of said yet the other optical communication module.

12. The optical communication module according to claim 1, wherein the front lens portion is disposed outside the housing, and the rear lens portion is disposed inside the housing.

13. The optical communication module according to claim 1, wherein the front lens portion is entirely disposed outside the housing, and the rear lens portion is entirely disposed inside the housing.

14. The optical communication module according to claim 1, further comprising: a flexible substrate disposed between the circuit board and the optical package, an elasticity of a bent portion of the flexible substrate holding afloat the optical block.

15. The optical communication module according to claim 1, wherein the optical block is free from contacting the housing.

* * * * *